(12) United States Patent
Macpherson, Jr.

(10) Patent No.: US 7,749,391 B2
(45) Date of Patent: Jul. 6, 2010

(54) COAGULANT-ENHANCED PRE-FILTRATION SYSTEM

(75) Inventor: John W. Macpherson, Jr., Cedar Crest, NM (US)

(73) Assignee: Natural Site Solutions, LLC, Redmond, WA (US)

( * ) Notice: Subject to any disclaimer, the term of this patent is extended or adjusted under 35 U.S.C. 154(b) by 665 days.

(21) Appl. No.: 11/564,004

(22) Filed: Nov. 28, 2006

(65) Prior Publication Data

US 2008/0121588 A1  May 29, 2008

(51) Int. Cl.
*C02F 1/54* (2006.01)
(52) U.S. Cl. .................. 210/710; 210/702; 210/730; 210/772; 210/791
(58) Field of Classification Search .................. 210/702
See application file for complete search history.

(56) References Cited

U.S. PATENT DOCUMENTS 4,350,597 A * 9/1982 Selm et al. .................. 588/315
6,110,374 A * 8/2000 Hughes ...................... 210/638
6,797,164 B2 * 9/2004 Leaverton .............. 210/167.12
6,821,427 B2 * 11/2004 Macpherson et al. ........ 210/631

FOREIGN PATENT DOCUMENTS

JP         355011065 A  *  1/1980

* cited by examiner

*Primary Examiner*—Peter A Hruskoci
(74) *Attorney, Agent, or Firm*—Black Lowe & Graham, PLLC

(57) ABSTRACT

A system and method is disclosed for pre-treating water to remove substantial amounts of particulates prior to filtration. A coagulant, such as chitosan is mixed with turbid water and adheres to particulate matter to form large clumps. The water/coagulant mixture is placed in a first reservoir elevated above a second reservoir having a strip of porous material, such as polyester felt, positioned with one end in the first reservoir and another end above the second reservoir and preferably below the waterline in the first reservoir. A middle portion of the porous material is elevated above the first and second ends, but at a height relative to the waterline of the first reservoir that is equal or less than the height water will rise in the porous material due to capillary action.

11 Claims, 5 Drawing Sheets

COAGULANT-ENHANCED PRE-FILTRATION SYSTEM

FIELD OF THE INVENTION

This invention relates generally to filtration systems and, more specifically, to systems and methods for removing sediment from turbid water.

BACKGROUND OF THE INVENTION

In a natural disaster such as a hurricane or earthquake or in the normal course of soil disruption due to construction activities the water system is often disrupted or contaminated. Often the only source of water will be found in streams, lakes, puddles, ditches, and the like. Such sources are typically laden with sediment in addition to bacteria and other contaminants. A typical ceramic filter, such as is used by backpackers or in emergency response kits, will quickly clog with sediment and become useless, not to mention their extraordinary cost relative to the scarce resources of disaster zones. For example, water having a turbidity of 500 NTU (Nephelometric Turbidity Units) will clog a typical ceramic filter after filtering 50 gallons.

In view of the foregoing, it would be an advancement in the art to provide a simple and cost effective way of preprocessing water prior to filtration in order to remove turbidity along with other harmful contaminants.

SUMMARY OF THE INVENTION

A system and method is disclosed for pre-treating water to remove substantial amounts of particulates prior to filtration. A coagulant is mixed with the turbid water and allowed time to adhere to the particulate matter in order to form large clumps (known as coagulation). In a preferred embodiment, the coagulant includes chitosan but may include a variety of other materials. The coagulant/water mixture is contained in a first reservoir elevated above a second reservoir. A strip of porous material is positioned having one end anchored in the first reservoir and another end above the second reservoir and preferably below the waterline in the first reservoir. A middle portion of the porous material is elevated above the first and second ends, but below the height to which water will rise in the porous material due to wicking or capillary action. Water is wicked upward within the porous material the water then falls toward the second end due to gravity and flows into the second reservoir. The coagulated particulate matter is filtered out by the porous material, such that the water flowing to the second reservoir is substantially less turbid. The water in the second reservoir may then be chemically disinfected and further filtered to remove compounds and other contaminants not removed by the porous material.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENTS

Figure 1:
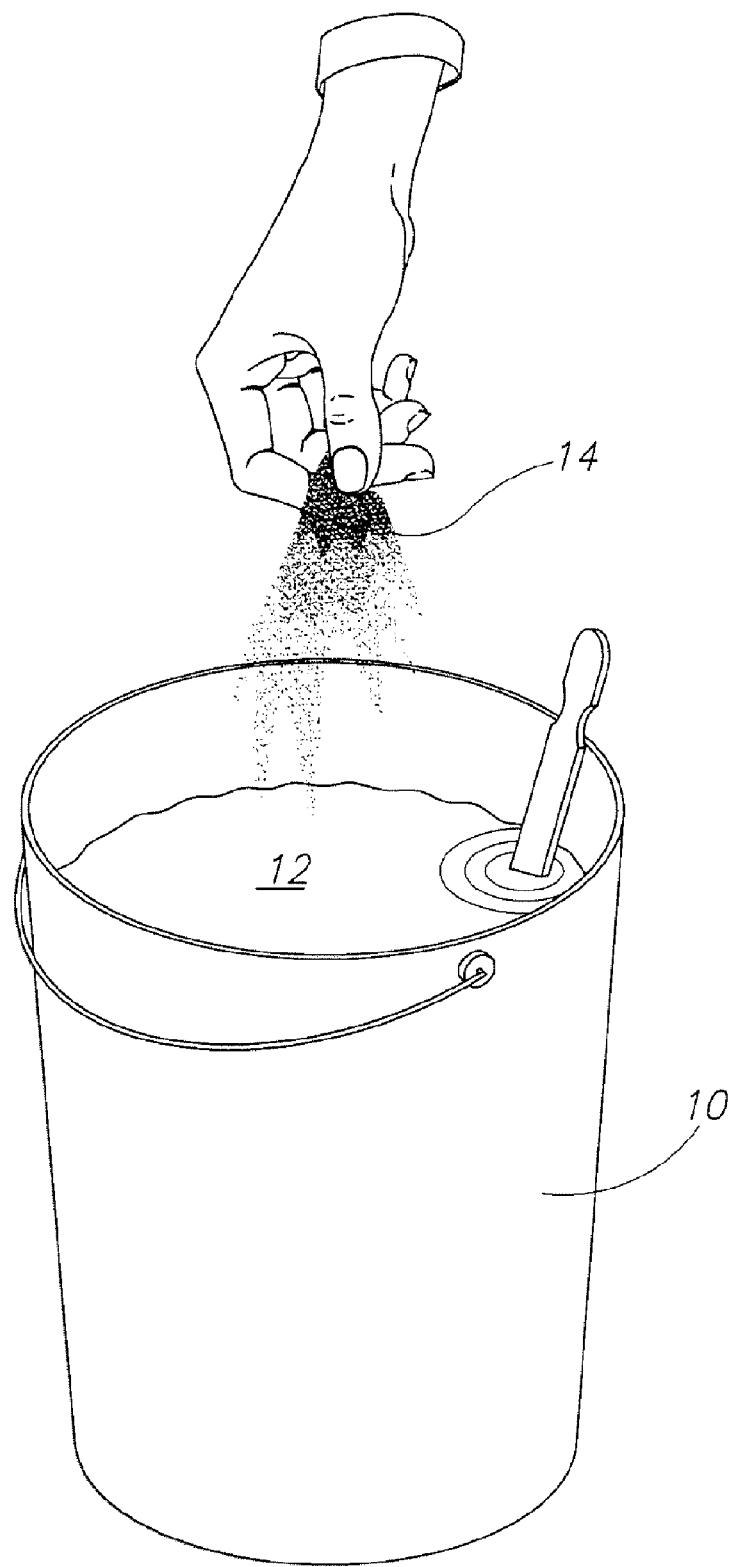
FIG. 1 is an isometric view of an initial step in a pretreatment process in accordance with an embodiment of the present invention.

Referring to FIG. 1, in one embodiment of the invention a reservoir 10 is filled with turbid water 12, such as water from a stream, canal, puddle, or the like. The present system will remove contaminants from virtually all turbid water, although in some cases further processing is required before the water is safe to drink. For example, sewage water, industrial wastewater, seawater, and other highly industrially-contaminated water may not be suitable for drinking water under any circumstances.

The turbid water 12 typically has large amounts of particulates that would tend to quickly clog a filter suitable for filtering out sediment, microbes and parasites. A small amount of a coagulant 14 is added to the turbid water 12 and mixed into the water 12, such as by stirring. The amount of stirring required depends on the turbidity of the water, with dirtier water requiring more stirring. The amount of coagulant 14 depends on the amount of water and the degree of turbidity. In some embodiments, from 0.5 to 1.5 grams of chitosan are used for each five gallons of water depending on the turbidity. In a preferred embodiment, a ratio of one gram per five gallons of water is used. The coagulant 14 causes the particulates to form larger clumps. The water 12 and coagulant 14 are typically allowed to stand for sufficient time for the clumps to form and settle to the bottom of the container. A delay of an hour has been found to be adequate.

The coagulant 14 may include chitosan, aluminum sulfate, ferrous sulfate, ferric chloride, or any number of coagulating or flocculating chemical agents, including those inducing electrochemical coagulation. Chitosan in particular provides the additional benefit of being biodegradable and adhering to heavy metals and other contaminants through a process known as chelation. Some forms of chitosan such as chitosan acetate and chitosan lactate also have anti-bacterial properties. Where chitosan is used the pH of the water may affect coagulation. Small amounts of baking soda can be used to raise the pH and limejuice, or the like, may be used to lower the pH in order to maintain the pH between 7.0 and 9.0.

Figure 2:
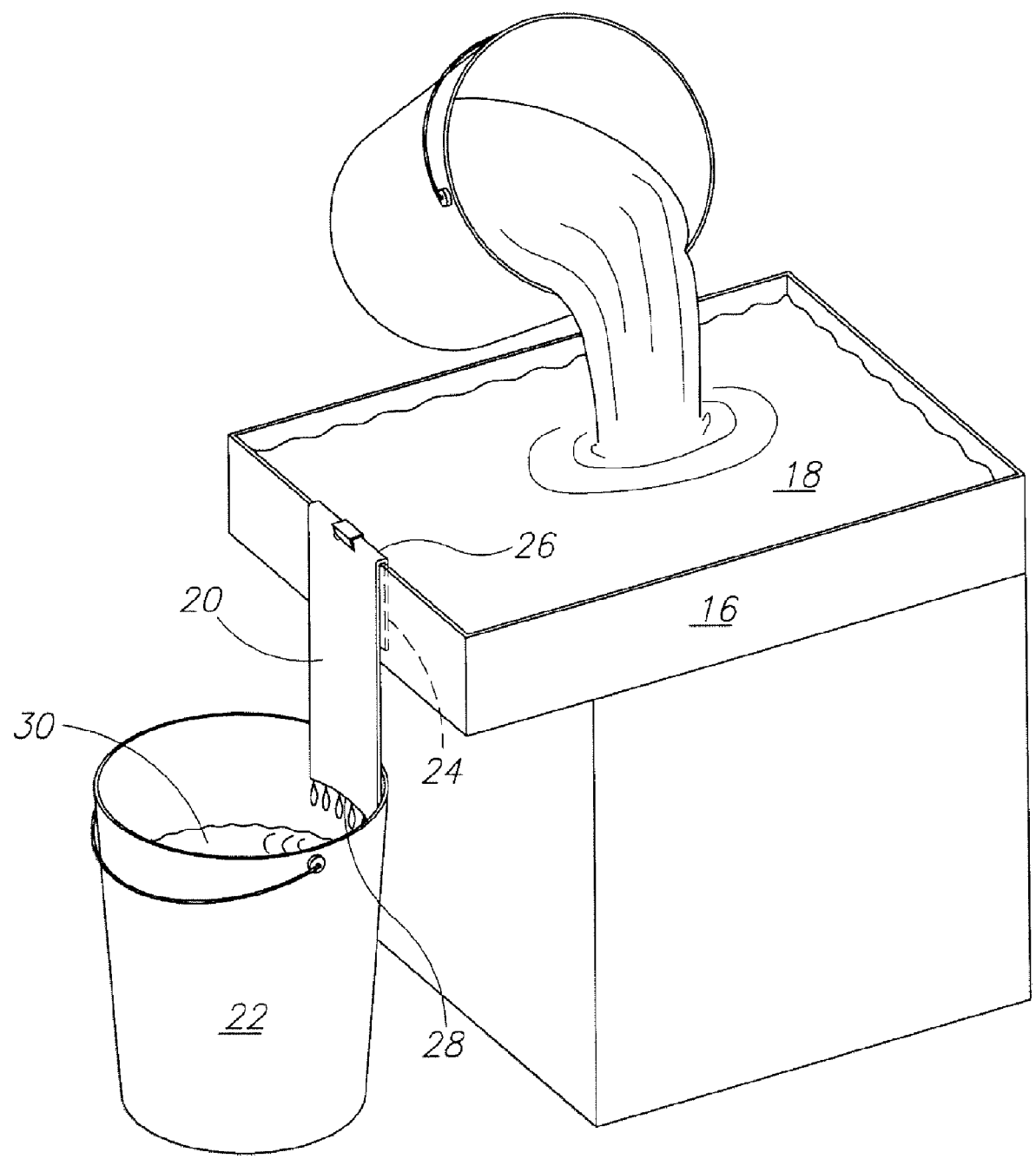
FIG. 2 is an isometric view of a pretreatment system in accordance with an embodiment of the present invention.

Referring to FIG. 2, a reservoir 16 holds the water/coagulant mixture 18 during filtration through a porous material 20. Various materials may be used for the porous material 20. In the preferred embodiment a strip of fibrous material, such as polyester felt is used. The porous material 20 preferably has a length at least double the maximum height that water will vertically rise in the porous material 20 due to wicking properties of the porous material. For purposes of this application the rise of water within the porous material is referred to as capillary action, although this term is most commonly used to describe the rise of water within small tubes due to the adhesive and cohesive properties of water. The rise of water within the porous material may also be induced by other physical phenomena, such as conventional siphoning through a porous material positioned within a tube oriented to sustain siphoning, although this will not produce the desired filtration effect. The reservoir 16 preferably elevates the waterline of the water/coagulant mixture 18 above the waterline of pretreated water in a reservoir 22. A first end 24 of the porous material 20 is positioned at or below the waterline of the water/coagulant mixture 18. The porous material 20 extends from the waterline to a point 26 above the waterline. In embodiments where capillary action is relied on to raise the water, the point 26 is preferably at a height above the waterline, at a level preferably less than or equal to the distance that water will rise in the porous material 20 due to capillary action, referred to hereinafter as the "capillary action height limit." The reservoir 16 has a rim that is typically at a height above the bottom of the water-holding volume of the reservoir 16 that is equal or less than the capillary action height limit of the porous material 20. A binder clip, paper clip, or like device may be used to secure the porous material 20 to the rim of the reservoir 16.

The second end 28 of the porous material is located outside the reservoir 16 such that water passing through the porous material 20 will fall into the reservoir 22 yielding preprocessed water 30 that has reduced particulate content. The second end 28 is preferably below the waterline of the water/coagulant mixture 18 such that the force of gravity will create in essence a siphon. The distance between the end 28 and the point 26 is typically equal or greater than the capillary action height limit. In this manner, weight of the water between the second end 28 and the point 26 will be sufficient to draw water out of the reservoir 16 similar to the function of a siphon. In order to initiate siphoning, it may be useful to wet the porous material 20 with clean water.

The coagulation of particulates in the water/coagulant mixture 18 enables the use of a porous material 20 having large pores to be used as both a capillary siphon and as a filter. Much of the untreated particulate matter naturally present in turbid water is sufficiently small to travel through the porous material 20 and into the reservoir 22. However, using a porous material 20 having smaller pores would result in frequent clogging and a lower flow rate. In the present invention, the coagulated particulates are large enough to be filtered out by a porous material 20 that allows for large flow rates and is less prone to clogging. Furthermore, the porous material 20, such as polyester felt, is readily cleaned and can therefore be used to remove large amounts of sediment.

Figure 3:
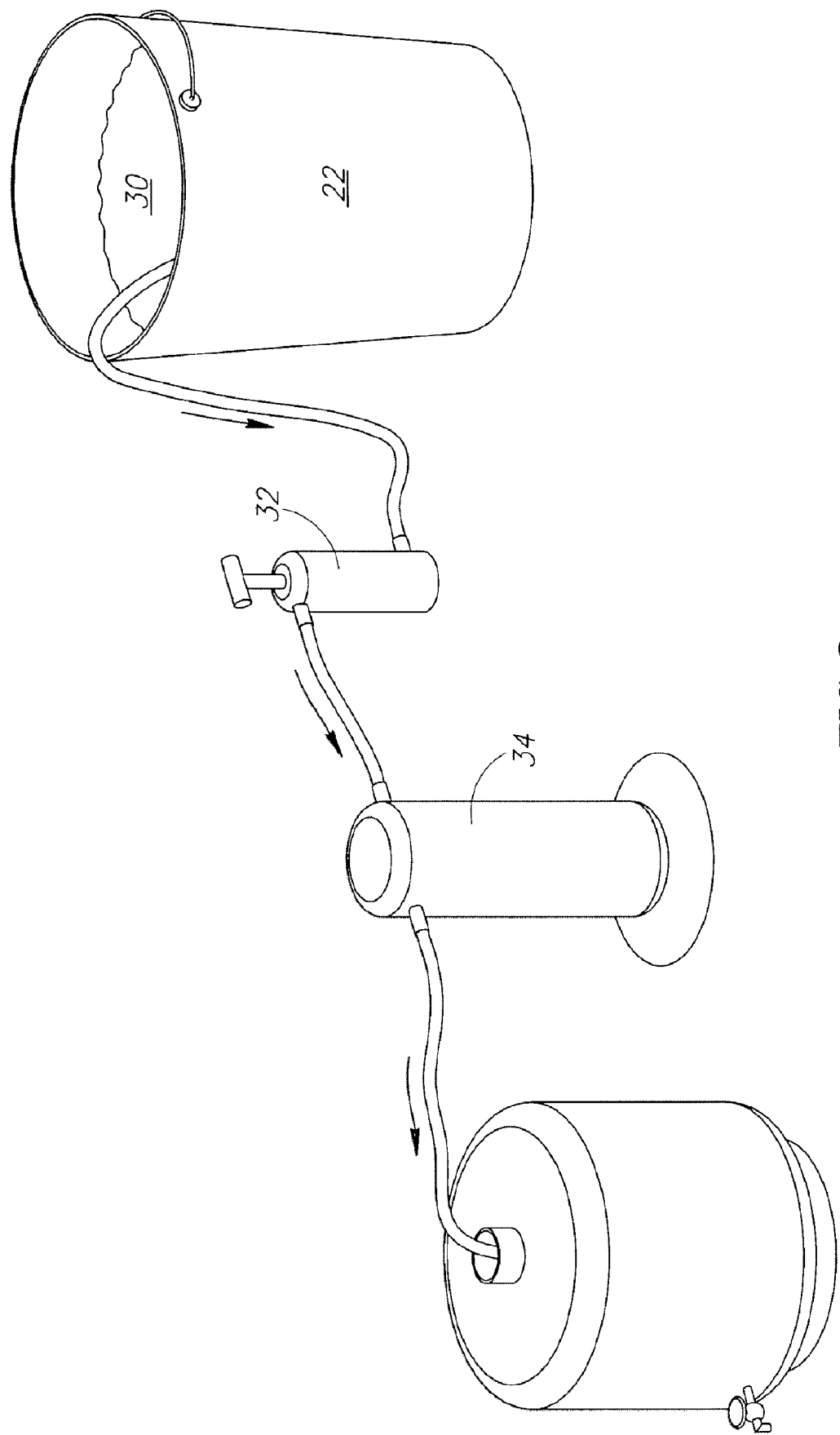
FIG. 3 is an isometric view of a filtration system in accordance with an embodiment of the invention.

Referring to FIG. 3, the preprocessed water 30 may then be filtered using a conventional ceramic, or other type of filter 32. Chemical disinfectants for the deactivation of viruses or other pathogens may be used to further purify the water 30. A carbon filter 34 may be used, either alone or with a ceramic filter 32, in order to remove the taste of chemical disinfectants from the water 30.

The preprocessed water 30 will typically still contain soluble contaminants and some finer particulate matter. However, a filter 32 is capable of removing such contaminants. Experiments conducted by the inventor have shown that a typical ceramic filter 32 intended for backpacking uses will filter 50 gallons of water having a turbidity of 500 NTU before becoming clogged. However, where water having the same turbidity is preprocessed according to the system of FIG. 3, the same filter 32 can filter over 2,000 gallons without clogging. The porous material 20 may be used to preprocess a virtually unlimited supply of water. As the porous material 20 becomes clogged it can be rinsed out and reused.

Figure 4:
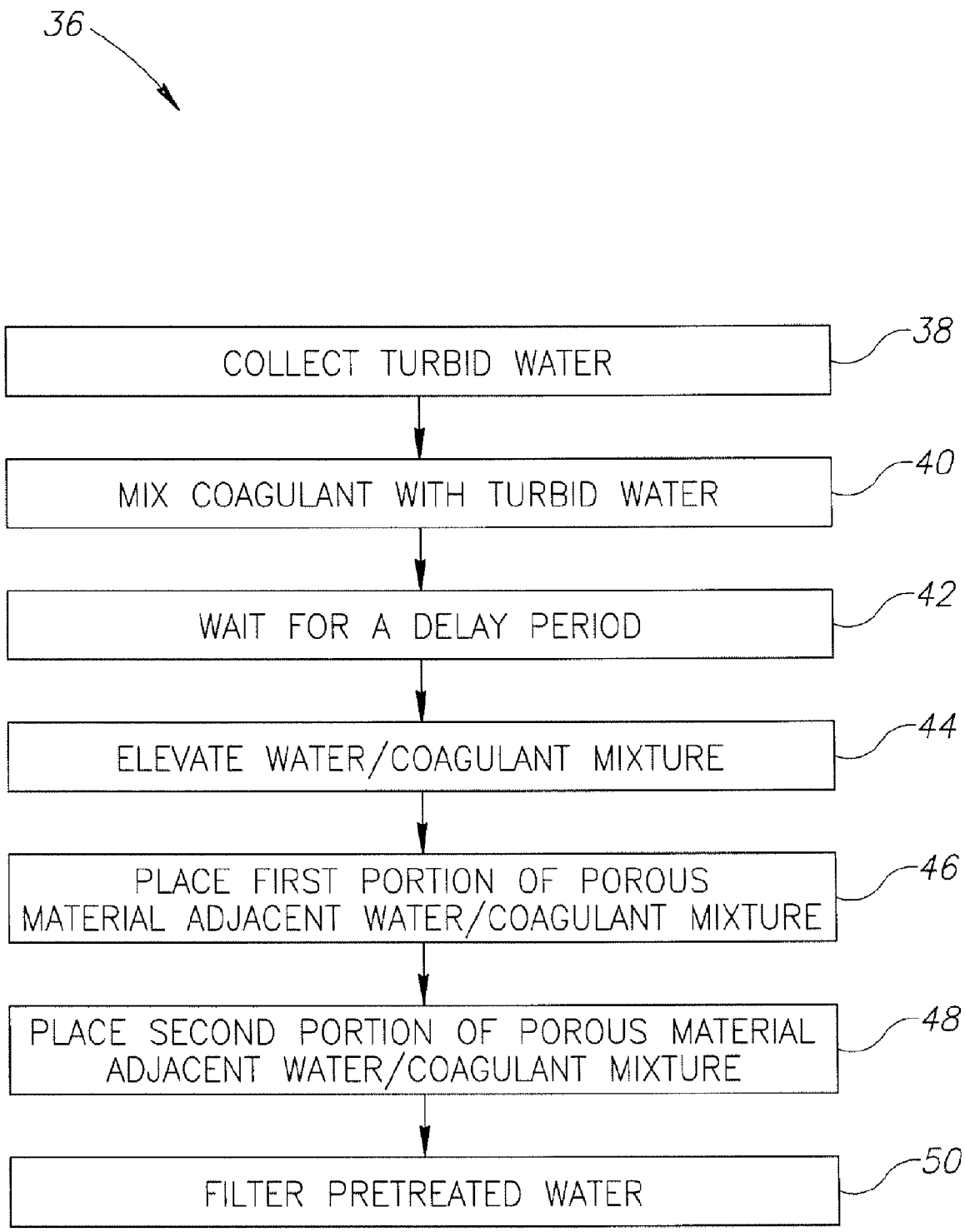
FIG. 4 is process flow diagram of a method for treating water in accordance with an embodiment of the present invention.

Referring to FIG. 4, a method 36 for treating water may include collecting turbid water at block 38. A coagulant, such as chitosan, is mixed with the turbid water at block 40. At block 42 the coagulant and turbid water is allowed to sit in order for the coagulant to bind to particulates within the turbid water. At block 44 the water/coagulant mixture is elevated, such as above a waterline of a reservoir for receiving pretreated water. Alternatively, the water/coagulant mixture may already be elevated above a reservoir at the time the coagulant is added. At block 46, a first portion of a strip of porous material is placed in the water/coagulant mixture such that water will be drawn up into the porous material. At block 48 a second portion of the strip of porous material, in this case continuous with the first portion, is placed adjacent the water/coagulant mixture such that water drawn up into the first portion will be drawn out from the second portion by gravity to yield pretreated water. At block 50, the pretreated water is optionally filtered by a ceramic or other type of filter.

Figure 5:
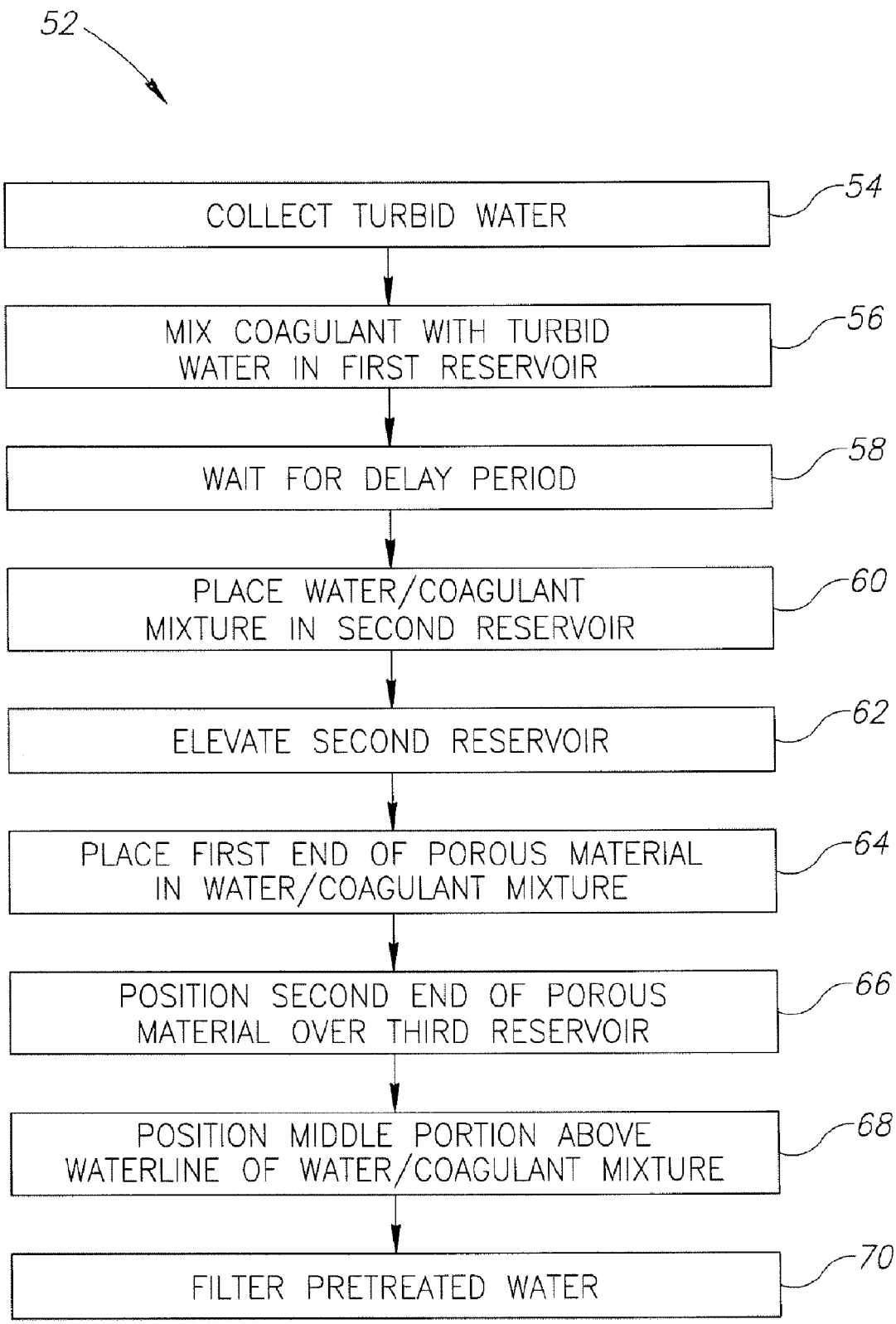
FIG. 5 is an alternate process flow diagram of a method for treating water.

Referring to FIG. 5, in another embodiment a method 52 includes the step of collecting turbid water at block 54 and mixing turbid water and a coagulant into a first reservoir at block 56. At block 58 the method 52 includes waiting for a delay period. At block 60, part, or all, of the water/coagulant mixture of the first reservoir is placed in a second reservoir. The water bearing volume of the second reservoir preferably has a height that is about equal or less than the capillary height limit of the porous material. In one embodiment, the limit is approximately 8 inches. In some embodiments, the second reservoir is used as the first reservoir for holding the water/coagulant mixture during the waiting period. In such embodiments, block 60 may be eliminated.

At block 62 the second reservoir is elevated with respect to a third reservoir such that the waterline of the second reservoir is above the waterline of the third reservoir. At block 64 a strip of porous material is positioned having its first end at or below the waterline of the water/coagulant mixture in the second reservoir. At block 66 a second end of the strip of porous material is positioned over the third reservoir such that the second end is below the waterline of the water/coagulant mixture in the second reservoir. At block 68 a middle portion of the porous material may be positioned above the waterline of the water/coagulant mixture in the second reservoir, but below the capillary action height limit of the porous material. The middle portion is also positioned such that length of porous material between the second and the highest point on the porous material is at least slightly greater than the capillary action height limit of the porous material. At block 70 pretreated water that has flowed into the third reservoir is further filtered, such as by a ceramic, or other type of filter.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for treating water comprising:
   adding a coagulant to a particulate laden water within a first reservoir to cause coagulation of small-sized sediment particles within the first reservoir;
   positioning a second reservoir such that a bottom of the second reservoir is below a waterline of the first reservoir;
   arranging a siphon and a filter consisting of a flexible porous material having pores capable of being used as both a capillary siphon and filter, wherein a first portion of the porous material is positioned or below the waterline, a second portion of the porous material is arranged to be outside the first reservoir such that water passing through the porous material will fall into the second reservoir, and a middle portion of the porous material elevated above the first portion and the second portion, wherein the water from the first reservoir is siphoned and filtered to produce water having a reduced particulate content in the second reservoir.

2. The method of claim 1, further comprising waiting for a delay period after placing the coagulant in the particulate laden water before the step of arranging the porous material.

3. The method of claim 1, wherein the step of arranging the porous material further comprises positioning an end of the second portion of the porous material below an end of the first portion of the porous material.

4. The method of claim 3, further comprising securing the middle portion of the porous material to a rim of the first reservoir, removing and rinsing the porous material when clogged with particulate matter, and replacing and reusing the porous material after rinsing.

5. The method of claim 1, further comprising positioning the middle portion of the porous material above the waterline of the particulate laden water but below a capillary action height limit of the porous material.

6. The method of claim 1, wherein the coagulant is chitosan.

7. The method of claim 1, wherein the coagulant includes about one gram of chitosan for about five gallons of particulate laden water.

8. The method of claim 1, wherein the porous material is a strip of flexible fibrous material and the method further comprises clipping the porous material to the first reservoir.

9. The method of claim 8, wherein the porous material is a polyester felt material.

10. The method of claim 1, wherein the middle portion of the porous material is positioned at a height about equal to or less than a capillary action height limit relative to a liquid level of the water in the first reservoir.

11. The method of claim 1, further comprising washing the porous material.

\* \* \* \* \*